United States Patent [19]

Tabor

[11] 4,438,952

[45] Mar. 27, 1984

[54] PIPE COUPLING

[75] Inventor: Harry Z. Tabor, Jerusalem, Israel

[73] Assignee: The Scientific Research Foundation, Jerusalem, Israel

[21] Appl. No.: 281,094

[22] Filed: Jul. 7, 1981

[30] Foreign Application Priority Data

Jul. 11, 1980 [IL] Israel ................................ 60562

[51] Int. Cl.³ ............................................. F16L 35/00
[52] U.S. Cl. ...................................... 285/39; 285/373; 285/383; 285/244
[58] Field of Search ............... 285/244, 409, 373, 419, 285/420, 424, 243, 39, 252, 383, 254; 24/20 S, 255 R, 256

[56] References Cited

U.S. PATENT DOCUMENTS

| | | | |
|---|---|---|---|
| 590,094 | 9/1897 | Duncan | 285/244 X |
| 2,880,017 | 3/1959 | Anderson et al. | 285/409 X |
| 2,980,143 | 4/1961 | Harris | 285/373 X |
| 4,280,722 | 7/1981 | Guptil et al. | 285/244 |
| 4,295,669 | 10/1981 | La Prade | 285/419 X |

FOREIGN PATENT DOCUMENTS

| | | | |
|---|---|---|---|
| 511640 | 12/1953 | Belgium | 285/419 |
| 909293 | 9/1972 | Canada | 285/373 |
| 811968 | 1/1937 | France | 24/20 S |

*Primary Examiner*—Dave W. Arola
*Attorney, Agent, or Firm*—Benjamin J. Barish

[57] ABSTRACT

A quickly-attachable pipe coupling comprises a flexible tube having an internal diameter approximately equal to the outer diameter of the pipe to be coupled, and a cylindrical spring overlying the flexible tube. The cylindrical spring includes a closely-wound coil of flat spring material having more than one turn, and having an inner diameter in its relaxed condition less than the outer diameter of the flexible tube. The coil spring is partially uncoilable under stress to open by increasing its inner diameter at least to the outer diameter of the flexible tube. Thus, the flexible tube and the cylindrical spring thereover, when in its stressed open condition, may be applied over the end of the pipe to be coupled, whereupon the cylindrical spring may be relaxed to close and to cause it to compress the flexible tube into tight engagement with the pipe for the complete length of the coil spring.

10 Claims, 11 Drawing Figures

1

PIPE COUPLING

BACKGROUND OF THE INVENTION

The present invention relates to quickly-attachable pipe couplings, and particularly to a coupling for use in coupling either two rigid pipes together, or one rigid pipe to a flexible tube.

Pipe couplings are known in the art comprising a metal band wound around a flexible pipe or tube and tightened, usually by means of a screw mechanism, for clamping the flexible tube to a rigid pipe with sufficient pressure to prevent leakage of fluid therefrom. The flexible tubes commonly used in such couplings may be made of natural or synthetic rubber or plastics, and are commonly referred to as elastomer tubes to indicate their elasticity, flexibility, and compressibility characteristics. By using a short length of the flexible tube having a hose clip or metal band at each end, they may be used to couple two rigid pipes together, one clip or band clamping the flexible tube to one pipe, and the other clip or band clamping the tube to the second pipe.

Among the major disadvantages of such pipe couplings as known in the art are: (a) the installer does not know how much compression to apply, since if too little is applied it can result in a weak coupling or leakage, and if too much is applied, it can cause irreversible damage to the elastomer tube; (b) the elastomer tube tends to take a permanent set, i.e. it tends to "flow" so that the compression that it applies to the rigid pipe gradually is diminished, this leading to a weakened coupling and the possibility of leakage; and (c) exposed portions of the elastomer may deteriorate because of ultra-violet radiation (in sunshine) or other combined atmospheric and radiation effects.

Another known form of pipe coupling includes a piece of spring wire, usually of circular cross-section and having a little more than one turn, with ears extending from the ends to permit the turn to be expanded—so as to slip over the elastomer—and then close down by the elastic forces. This type of coupling suffers from the same disadvantages as the first form, except that the pressure applied is not controlled by the installer. On the other hand, the narrow form of these clips can result in cutting of the elastomer (i.e. a short life for the system) and in a tendency for the rigid pipe to pull-out of the coupling when high internal pressure produces an axial force on the pipe. This force (B) may be expressed by the equation $B = \pi D^2 P$, where "D" is the diameter of the pipe, and "p" is the pressure of the fluid in the pipe. This force must be resisted by the friction of the elastomer on the tube, i.e. $\pi Dl\mu P$, where "$\mu$" is the coefficient of friction between the elastomer and the pipe, "P" is the compression force per unit area, and "l" is the length of the elastomer which is under compression. Thus, $$l = \frac{D}{4\mu} \frac{p}{P} = \frac{D}{4\mu} \text{ for } p = P$$

Since, in these types of couplings, "l" is usually less than $D/4\mu$, it is necessary to use a compression force "P" considerably greater than "p".

An object of the present invention is to provide a new form of pipe coupling having advantages in the above respects over both of the above known types of couplings, and which has the further advantage of permitting its quick attachment to the pipe or pipes to be coupled.

BRIEF SUMMARY OF THE INVENTION

According to a broad aspect of the present invention, there is provided a quickly-attachable coupling for pipes, characterized in that it comprises: a flexible tube having an internal diameter approximately equal to the outer diameter of the pipe to be coupled; and a cylindrical spring overlying said flexible tube; said cylindrical spring including a closely-wound coil of flat spring material having more than one turn, and having an inner diameter in its relaxed condition less than the outer diameter of the flexible tube; said coil spring being partially uncoilable under stress to open same by increasing its inner diameter at least to the outer diameter of the flexible tube, whereby the flexible tube and the cylindrical spring thereover, when in its stressed open condition, may be applied over the end of the pipe to be coupled, whereupon the cylindrical spring may be relaxed to close same and to cause it to compress the flexible tube into tight engagement with the pipe for the complete length of the coil spring.

It will thus be seen that an essential component of the coupling is a close-wound flat cylindrical spring of more than one turn. The expression "flat cylindrical" refers to the structure obtained by wrapping a flat strip of springy material round a cylindrical mandrel; "closewound" means that there is substantially no gap between the turns, which lie on top of one another; and "more than one turn" means any arc length greater than $2\pi$ radians.

For joining two rigid pipes, the cylindrical spring is assembled over a flexible tube of approximately the same length as, or slightly shorter than, the axial length of the cylindrical spring, the flexible tube inner diameter (ID) being approximately equal to the outer diameter (OD) of the rigid pipes, so that the flexible tube can be pushed over the ends of the two pipes with approximately half on one pipe and half on the other. The ID of the cylindrical spring, in its free, unstressed (closed) condition is less than the OD of the flexible tube so that it can only be assembled over the flexible tube by partial uncoiling (opening) the cylindrical spring until its ID is equal to or greater than the OD of the flexible tube. The uncoiling may be achieved by a special tool or by a toggle mechanism to be described. When the uncoiling force is released, the spring closes on the flexible tube, providing a means compression force (P̄) per unit area over the flexible tube and hence over the rigid pipe. If this pressure is less than the pressure of the fluid in the pipe, the latter pressure will tend to lift the flexible tube; therefore P̄ whould be made equal to or greater than the maximum expected pressure in the pipe fluid.

Because the cylindrical spring has an arc length greater than 360° and is of the same (or longer) length than the flexible tube, the tube is completely covered and protected from the atmosphere. Furthermore, if the outer diameters (OD) of the rigid pipe and the flexible tube are known, the compression that is exerted is predetermined by preselected parameters, namely, the initial (unstressed) ID of the cylindrical spring, the spring properties, material thickness, etc. Thus the installer does not have to exercise any judgement with respect to the degree of tightening, as with traditional hose clips. Furthermore, the difference between the ID of the cylindrical spring when in its closed unstressed condition and when in its open stressed condition can be considerable; thus, even if the flexible tube flows slightly with time, so that its effective wall thickness decreases, the spring pressure will only decrease slightly, and this may be allowed for in the initial design.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
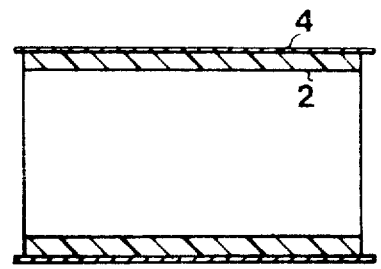
FIG. 1 is a longitudinal sectional view illustrating one form of quickly-attachable coupling constructed in accordance with the invention.

The quickly-attachable coupling illustrated in FIG. 1 comprises a flexible or elastomer tube 2 and an overlying cylindrical spring 4. Cylindrical spring 4 includes a closely-wound coil of flat spring material having more than one turn, and having an inner diameter (ID) in its relaxed (closed) condition less than the outer diameter (OD) of the flexible tube 2. The cylindrical spring 4 is partially uncoilable under stress to increase its inner diameter at least to that of the outer diameter of the flexible tube. Thus, the flexible tube 2 and the cylindrical spring 4 thereover, when the latter is in its stressed, uncoiled (open) condition, may be applied over the end of the pipe (not shown) to be coupled, whereupon the cylindrical spring 4 may then be relaxed to cause same to close and to compress the flexible tube 2 into tight engagement with the pipe for the complete length of the cylindrical spring.

Figure 2A:
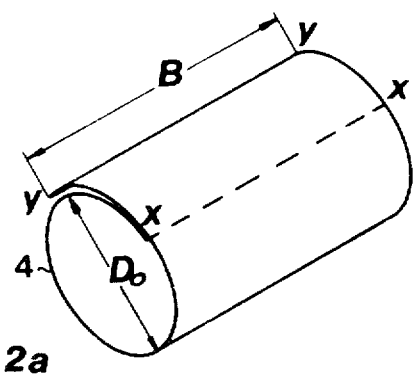
FIGS. 2a and 2b illustrate the spring of the FIG. 1 coupling in its unstressed (closed) and stressed (open) conditions, respectively.
Figure 2B:
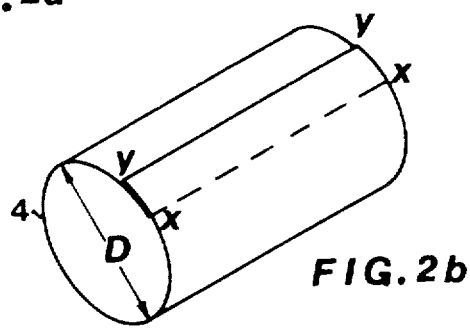

FIG. 2a illustrates the cylindrical spring 4 in its relaxed, closed condition; and FIG. 2b illustrates it in its stressed, open condition. The length of the cylindrical spring is indicated as "B"; its unstressed (closed) inner diameter (ID) is indicated as $D_o$ (FIG. 2a); and its stressed (open) ID is indicated as D (FIG. 2b). As one example, the cylindrical spring may have about 1.3 turns (468°) when unstressed (FIG. 2a), and about 1.1 turns (360°) when stressed (FIG. 2b). In this example, the inner diameter ($D/D_o$) increases by 18% from its open, stressed condition to its closed unstressed condition.

In order to be able to partially uncoil the spring, the inner-most edge XX of the metal strip is made longer than the axial length of the cylinder to provide ends projecting outside the cylindrical length. Apertures or posts (the latter being shown in FIGS. 3a–3c) may be provided at the projection points to facilitate the use of a tool or toggle mechanism (described below in FIGS. 3a–3c) to engage this edge XX in order to apply a force between it and the outermost edge YY in order to uncoil the cylindrical spring to its open stressed condition as illustrated in FIG. 2b.

Figure 3A:
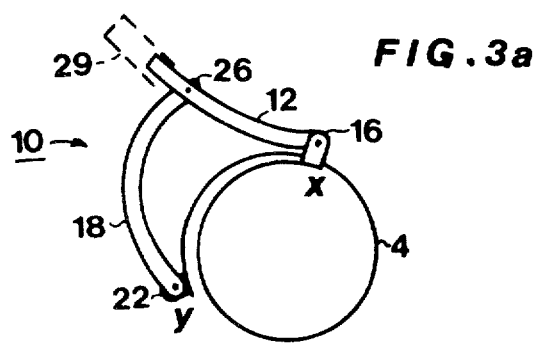
FIGS. 3a–3c illustrate the cylindrical spring of FIGS. 2a, 2b equipped with a toggle mechanism to facilitate opening and closing it.
Figure 3C:
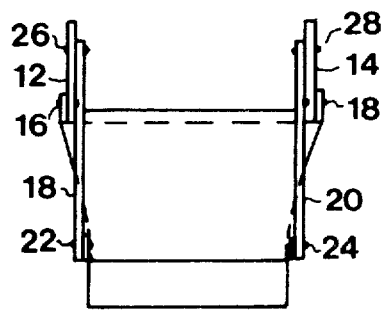
Figure 3B:
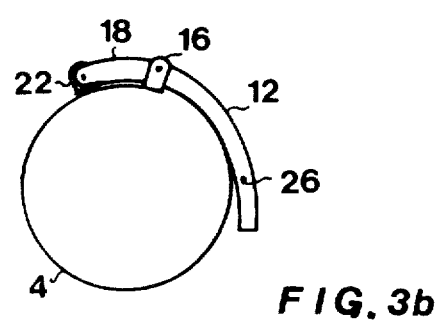

FIGS. 3a–3c illustrate the use of a toggle mechanism to facilitate the opening and closing of the cylindrical spring 4. This toggle mechanism, generally designated 10, comprises an inner pair of arms 12, 14 hinged to posts 16 and 18, respectively, at the ends of the inner edge XX of the cylindrical spring 4, and an outer pair of arms 18, 20 hinged at one end to posts 22 and 24, respectively, at the outer edge YY of the cylindrical spring. The opposite ends of arms 18, 20 are hinged at points 26, 28, respectively, to the outer ends of arms 12 and 14.

Arms 12 and 14 serve as the actuator arms of the toggle mechanism and are so dimensioned, with respect to arms 18 and 20 and the above hinged mountings, that when arms 12 and 14 are moved to the toggle-open position as illustrated in FIG. 3a, no force is applied between the opposite edges XX-YY of the cylindrical spring, so that the spring is in the unstressed, closed condition shown in FIG. 2a; whereas if the arms 10 and 12 are moved to the toggle-closed position as illustrated in FIG. 3b, a force is applied between the opposite edges of the cylindrical spring forcing them apart to thereby increase the diameter of the cylindrical spring and to place it under the stressed, open condition shown in FIG. 2b.

Preferably, the arms 12, 14, 18 and 20 are curved so that in the stressed open condition of the cylindrical spring (which is the closed condition of the toggle) as illustrated in FIG. 3b, these arms substantially conform to the curvature of the cylindrical spring. Preferably, arms 10, 12 are provided with extensions as shown at 26 in FIGS. 3a and 3b, adapted to be engaged by a tool 29 (FIG. 3a) to increase the leverage when actuating the toggle mechanism.

It is to be noted that, contrary to some hose clips known in the art in which a toggle is used to close the clip, the toggle mechanism illustrated in FIGS. 3a–3c is used to open the cylindrical spring 4, the clamping pressure being provided not by the toggle but by the elasticity of the cylindrical spring itself.

Where the couplings are to be used in large numbers, the toggle mechanism 10 can be omitted. Instead, there can be used a tool that operates like the toggle, the tool being inserted into holes at the opposite ends of the cylindrical spring (i.e., along edges XX and YY) which tool would be used to open the cylindrical spring when attaching the coupling to the pipe being coupled, whereupon the tool would be removed. In such a case, it would be preferred not to preassemble the cylindrical spring and the flexible tube; rather, it would be preferable to deliver both to the site separately, and to assemble them at the site in order to avoid possible damage to the flexible tube by the closed, unstressed cylindrical spring.

If the coupling includes the toggle mechanism as illustrated in FIGS. 3a–3c, the toggle mechanism may be actuated to the position illustrated in FIG. 3b wherein the cylindrical spring is in its opened stressed condition and would therefore be ready for installation. A strip of adhesive tape (not shown) may be wound around the toggle to prevent inadvertant closure in transit. After the flexible tube has been slipped over the ends of the two rigid pipes to be connected, the toggle is released by moving its arms 12 and 14 to the position illustrated in FIG. 2a, whereupon the inherent elasticity of the spring 4 causes it to reduce its diameter and to thereby finally compress the flexible tube into tight engagement with the pipe for the complete length of the cylindrical spring. When the toggle has thus been moved to its released position illustrated in FIG. 2a, it plays no further part except that at some later date it may be used to open the coupling if desired.

As one example, the cylindrical spring 4 may have a length (B) and an inner diameter (ID) such that in the closed, unstressed condition (FIG. 2a) it includes about 1.3 turns, i.e., 2.6$\pi$ radians, or 468°; whereas in the open, stressed condition (FIG. 2b) it comprises 1.1 turns, i.e., 2.2$\pi$ radians, or 396°. In such a case, the inner diameter ID increases by about 18%; i.e. $D=1.3\ D_o/1.1=1.18\ D_o$.

The compression force exerted by the spring 4 in the open position can be designed by choice of thickness of the spring material and the number of turns. If "$a$" is the "uncoiling fraction" defined as $$a = \frac{N_o - N}{N_o} = \frac{\theta_o - \theta}{\theta_o} \quad \text{(eq. 1)}$$

N = number of turns in the open, stressed condition;
$N_o$ = number of turns in the relaxed closed condition;
$\theta_o$ = angular arc of spring in the closed, relaxed condition (i.e., $\theta_o = 2\pi N_o$);
$\theta$ = angular arc of spring in the open condition (i.e., $\theta = 2\pi N$);
R = change in radius of the spring coil between open and closed conditions;
$R_o$ = radius of the spring in the closed condition; and
$D_o$ = diameter of the spring in the closed condition (i.e., $D_o = 2R_o$);

Then it may be shown that the maximum stress "s" in the spring material is given approximately by:

$$s = \left[ \frac{3E^2 \bar{P}^2}{2N(1 + \frac{2}{3}a)} \right]^{\frac{1}{3}} \quad \text{(eq. 2)}$$

where
E = the elastic (Young's) modulus of the spring material; and
$\bar{P}$ = mean radial pressure per unit area exerted by the spring in its open position Also, the thickness "h" of the spring material to produce the mean pressure $\bar{P}$ is given approximately by:

$$\frac{h}{D_o} = \left[ \frac{3}{2} \frac{\bar{P}}{Ns(1 + 2a/3)} \right]^{\frac{1}{3}} \quad \text{(eq. 3)}$$

Figure 7:
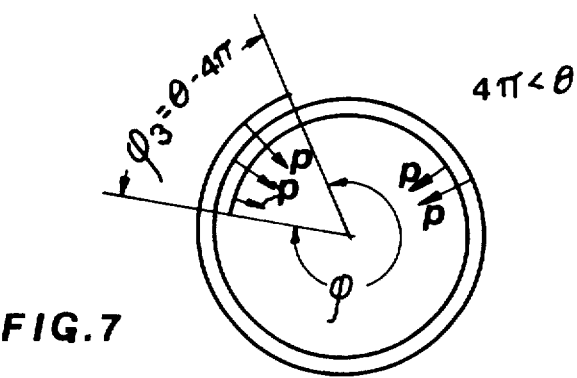
FIG. 7 illustrates a further variation in the construction of the cylindrical spring used in the coupling of the preceding figures.

The mean unit pressure $\bar{P}$ is derived from an actual unit pressure P exerted by each square cm of the spring in the stressed condition. Thus, the pressure may be increased as desired, as shown in FIG. 7, wherein the angular arc of the strip material in the relaxed, closed condition comprises greater than 1.3 turns, being approximately 2.3 turns. Because in use the pressure at the opposite ends of the tube irrespective of its diameter must be equal (and allowing for the fact that the elastomer behaves somewhat as a liquid, i.e. equalizing the pressure on the tube), the mean pressure $\bar{P} = NP$.

As already indicated, this mean pressure is chosen by the designer to be greater than the maximum expected pressure of fluid in the pipe. The change in radius $$\delta R = \frac{a}{1-a} R_o.$$

The designer should make this quantity several times the reduction in thickness of the flexible tube wall expected during the lifetime of the tube, thereby ensuring adequate pressure to seal the joint at all times. This defines the desirable minimum value of "$a$" i.e.

$$a = \frac{\delta R}{R_o} / (1 + \delta R/R_o)$$

As an example, if $R_o = 12$ mm and the flexible tube, whose wall thickness may be, e.g., 3 mm, is expected to flow $\frac{1}{2}$ mm under constant compression, then $\delta R$ should be, e.g., $5 \times \frac{1}{2}$ mm; i.e., $a = 0.172$.

It is desirable that the maximum stress "s" by kept below the yield stress of the material. Equation (2) permits checking that this condition is fulfilled. Note that the dimensions of the tube do not appear in equation (2); i.e., for a given spring material and a given design compression force $\bar{P}$, the stress "s" will be the same for all sizes for the same "$a$". If the calculated stress is too high, then it can be reduced by using a lower value for "$a$" or increasing N. As an example:

E (spring steel) = $2.04 \times 10^6$ kg/cm² ($29 \times 10^6$ psi);

$N - 1.1$;

$P = 4$ kg/cm² (57 psi);

$a = 0.172$ (as in the example quoted).

Then s = 8500 kg/cm² (121,000 psi). This is a permissible stress for good quality hardened spring steel, and allows a margin for the slight extra opening of the spring caused by the toggle mechanism.

The thickness of the strip from which the spring is made is given by equation (3). For the present example $$\frac{h}{D} = \left[ \frac{3}{2} \frac{\bar{P}}{Ns(1 + \frac{2}{3}a)} \right]^{\frac{1}{3}} = .0242$$

That is, for a spring of $D_o = 2.4$ cm, h = 0.58 mm. Note that D is the mean diameter of the spring, i.e., the arithmetical mean of the outer and inner diameters of the spring.

Equation 2 presents the design constraint i.e.

$$\frac{\bar{P}a^2}{N(1 + \frac{2}{3}a)} = \frac{2s^3}{3E^2} \quad \text{(3a)}$$

which is a property of the material chosen. If, for a given value of "$a$" the value of $\bar{P}$ is not sufficient, then the number of turns is increased.

The flexible tubes will normally be cut from a length of tubing produced by extrusion or other methods of producing such tubes of elastomer material: the tubes may be reinforced with fabric or fibre as is known in the art.

Where special properties may be needed, for example operation at elevated temperatures or in contact with oils or other chemicals, special materials may be used for the flexible tube (for example EPDM). Thus the flexible tube may be made by moulding each piece separately. In this case it is convenient to include an internal projection at the centre of the flexible tube length to serve as an abutment for each of the rigid pipes inserted into its opposite ends.

Figure 4:
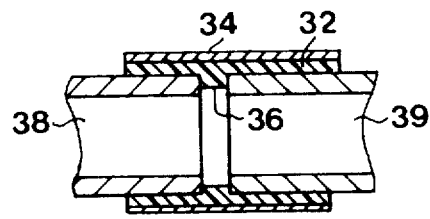
FIG. 4 is a longitudinal sectional view illustrating a variation in the quickly-attachable coupling of FIG. 1.

The foregoing is illustrated in FIG. 4, wherein it will be seen that the flexible tube, therein generally designated 32 adapted to receive the cylindrical spring 34 thereover, is made of molded plastics material having an internal rib 36 integrally formed on its inner face intermediate its length. This rib 36 serves as an internal abutment engageable by the opposite ends of the coupled pipes 38, 39 when the latter are inserted into the opposite ends of the flexible tube 32.

Figure 5A:
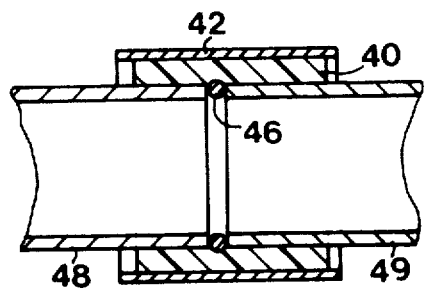
FIGS. 5a and 5b are longitudinal and transverse sectional views, respectively, illustrating another variation in the coupling of FIG. 1.
Figure 5B:
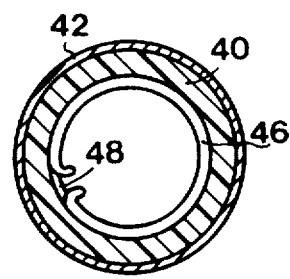

FIGS. 5a and 5b illustrate a variation, wherein the internal abutment for the two tubes to be coupled is defined by an abutment ring 46 inserted into an annular recess 48 formed in the inner surface of the flexible tube 40. As in the previously described embodiments, the outer face of the flexible tube 40 receives the above-described cylindrical spring 42, in its open, stressed condition, which spring, after coupling to the two pipes 48, 49, is relaxed to close same and to compress the flexible tube into tight engagement with the two pipes.

The recommended length " " of overlap of the flexible tube on the pipe is given by $l \geq D/4\mu$ (eq. 4) this being the condition that the pressure "p" of the fluid in the pipe will not pull the pipe out of the flexible tube (assuming that the compression force $P > p$, a condition that should be satisfied anyway to prevent leakage). For most elastomeric flexible tubes, the coefficient of friction between the elastomer and the pipe will be of the order of 1 or more; thus, if $l > D/4$, the length of the coupling (i.e. flexible tube and spring) will be somewhat greater than D/2. If very low friction coefficient elastomers are used, the length will be increased as indicated by equation (4).

Figure 6:
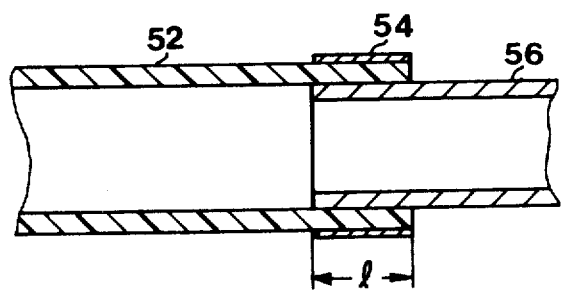
FIG. 6 is a longitudinal sectional view illustrating another coupling constructed in accordance with the invention for coupling a flexible tube to a rigid tube.

While the above description has referred to a coupling for coupling two rigid pipes together by means of a finite length of flexible tube compressed by a superimposed cylindrical spring, it will be appreciated that the invention may also be used for coupling a single rigid pipe to a flexible pipe or tube. This is illustrated in FIG. 6, wherein the flexible tube, therein designated 52, carries only at its outer end the superimposed cylindrical spring 54, which outer end is adapted to receive the rigid pipe 56 to be coupled to the flexible tube 52. It will be seen that in this case the cylindrical spring 54 will protect against ultraviolet light only the portion of the flexible tube 52 covered thereby, but it will still apply a compressive force for its complete length to engage the coupled end of the rigid tube 56.

While the invention has been described with respect to several preferred embodiments, it will be appreciated that many other variations, modifications and applications of the invention may be made.

What is claimed is:

1. A quickly-attachable coupling for pipes, characterized in that it comprises: a flexible tube having an internal diameter approximately equal to the outer diameter of the pipe to be coupled; and a cylindrical spring overlying said flexible tube; said cylindrical spring including a closely-wound coil of flat spring material having more than one complete turn, in both an open and closed position and having an inner diameter in its relaxed condition less than the outer diameter of the flexible tube said coil spring being partially uncoilable under stress to open same by increasing its inner diameter at least to the outer diameter of the flexible tube and of the pipe to be coupled the opposite ends of the flat spring material forming the cylindrical spring including a toggle mechanism actuatable to one position for uncoiling the cylindrical spring under stress to open same, or to a second position permitting the relaxing of the cylindrical spring to close same and to cause it to compress the flexible tube into tight engagement with the pipe for the complete length of the coil spring.

2. A coupling according to claim 1, wherein said coil of the cylindrical spring has an arc length in its unstressed closed condition of at least 1.3 turns.

3. A coupling according to claim 1, wherein the cylindrical spring is of an axial length at least equal to that of the flexible tube, enabling the coupling to be used for coupling two pipes together inserted into the opposite ends of the flexible tube.

4. A coupling according to claim 3, wherein the flexible tube includes an internal abutment intermediate its length and engageable with the ends of the two pipes when inserted into the opposite ends of the flexible tube.

5. A coupling according to claim 4, wherein said internal abutment is defined by an internal flange integrally formed in the inner surface of the flexible tube.

6. A coupling according to claim 4, wherein said internal abutment is defined by an abutment ring inserted into an annular recess formed in the inner surface of the flexible tube.

7. A coupling according to claim 1, wherein the cylindrical spring is of an axial length less than that of the flexible tube, enabling the coupling to be used for coupling one pipe to the flexible tube.

8. A coupling according to claim 1, wherein the flat springy material forming the cylindrical spring is wider at one end than at its opposite end to provide projecting portions at said one end facilitating the partial uncoiling of the cylindrical spring.

9. A coupling according to claim 1, wherein said toggle mechanism includes an actuator arm which is curved to conform to the curvature of the cylindrical spring in the stressed open condition thereof.

10. A coupling according to claim 9, wherein the free end of said actuator arm includes a projection engageable by a tool increasing the leverage when moving the actuator arm.

* * * * *